Patented Nov. 14, 1939

2,180,051

UNITED STATES PATENT OFFICE 2,180,051

REMOVAL OF GAS FROM ORGANIC LIQUIDS

Kenneth C. D. Hickman, Rochester, N. Y., assignor, by mesne assignments, to Distillation Products, Inc., Rochester, N. Y., a corporation of Delaware No Drawing. Application December 1, 1937, Serial No. 177,553

2 Claims. (Cl. 202—52)

This invention relates to the removal of absorbed gases from organic liquids such as oils, particularly preliminary to short path or molecular distillation.

The preliminary removal of absorbed gases is well known and is described in Patents 1,942,858, 1,955,321 and British 457,777. This treatment was applied for the purpose of removing absorbed gases prior to molecular distillation. The procedure employed for removing the absorbed gases was merely to subject the oils to "reduced pressure" or "degassing".

This invention has for its object to provide an improved method for preliminary degassing of organic oils. A further object is to provide an improved method for removing gases from organic oils which are to be subjected to high vacuum, short path or molecular distillation. Other objects will become apparent from the following detailed description.

When an organic oil is subjected to degassing, as disclosed in the prior art, apparent evolution of gases soon ceases. Pressures heretofore used for degassing were not extremely low, but even with very low pressures evolution of gas was apparent only for short periods of time. Prior investigators assumed that such degassing was complete and sufficient for all purposes of high vacuum distillation. I have found that organic oils tenaciously retain absorbed gases and that the degassing treatments of the prior art have ineffectively removed them from the oil. For instance it has been found that an oil which has been passed in a film over a column as in usual degassing practice at a pressure of .001 mm. still retains absorbed gases which can exert a pressure in excess of .001 mm. This is true even though apparent evolution of gas had ceased and the pressure employed was much below that usually used for degassing. An oil treated in this manner if sealed in a tube at .001 mm. soon gives off sufficient gases to destroy the vacuum. The internal pressure of the gas dissolved in the oil remained far above the pressure to which the oil was subjected. These dissolved and unremoved gases and vapors may react harmfully with valuable constituents in the oil and are often given off at certain stages in a molecular still where they spoil the vacuum and greatly interfere with the distillation.

It has been found that gases absorbed in organic liquids such as oils can be removed so completely that there is not enough left in the oil to later exert a pressure substantially in excess of that used during the degassing operation. In other words the oil can be prepared for molecular distillation more satisfactorily and more thoroughly than was heretofore possible. This preparation is accomplished by subjecting the oils to a reduced pressure such as would normally be used for high vacuum, short path or molecular distillation and maintaining this reduced pressure for a prolonged period of time, or by subjecting the oil while in the form of a thin film under extreme agitation to this same reduced pressure. The vacuum treatment is continued until the pressure of gas remaining in the oil is in approximate equilibrium with the pressure above the oil surface. Expressed in another way the oil is degassed by prolonged exposure to vacuum conditions, or shorter exposure with drastic agitation until the internal and external pressures of the gas are in substantial equilibrium at the temperature prevailing.

In order to degas to equilibrium the oil can be subjected to the required reduced pressure in the form of a body which preferably is agitated by means such as a mechanical stirrer. The oil may also be caused to give up its gas while in the form of a static or slowly flowing film. In both of these cases, degassing to equilibrium requires a considerable period of time and it is, therefore, preferred to employ means whereby the oil is subjected to the required reduced pressure while in the form of rapidly moving, highly agitated, thin films. One improved apparatus for carrying out such treatment is a centrifugal apparatus of the nature described in my copending application #177,552 filed December 1, 1937.

The centrifugal treatment involves passing the oil to be degassed over a series of rotating plates which are maintained under reduced pressure. The oil flows by centrifugal force over the surfaces of the plates in the form of a rapidly agitated thin film. It may also be caused to leave the plate as a curtain of droplets or as a thin sheet in which form removal of gas is considerably greater. The series of plates are preferably maintained under progressively decreasing pressure so that the large volumes of absorbed gas can be removed in the first stages at relatively high pressures and the minute amounts of residual gas at greatly reduced pressures. Due to the form and condition of the oil during such treatment, removal of gas takes place with much greater rapidity than is possible with the methods described above. However, it will be apparent that these or other methods of accomplishing the same result with less or greater amounts of time can be used. One such method in addition to those mentioned is the dispersion of the oil into droplets by forcing it through spray nozzles into the vacuum chambers. The term "extreme agitation" as used herein and in the claims is to be understood as defining agitation of this type.

The final pressure of absorbed gas in the oil should be reduced to below about .01 mm. and preferably below about .005 mm. For this reason, the pressure in the final stages of degassing treatment should be at least as low as these values. However, it is preferred to have even lower pressures prevail during the final stages of degassing such as pressures of about .001 mm. since the rate of removal of the residual absorbed gases is thereby substantially increased. Pumps in the final stages may be of any well known type capable of producing and maintaining such low pressures. Examples of such suitable pumps are high vacuum oil pumps and condensation pumps operating with mercury or organic pump fluids and having one or more stages.

The period of time required to produce a degassing, such that the internal pressure of the oil is below the preferred values, will vary greatly according to the type of degassing apparatus employed, the pressures used and the nature of the oil treated. With centrifugal apparatus, degassing of fish oils to below .005 mm. requires a period of only a few minutes and usually less than about one minute. The oil is allowed to flow through the centrifugal apparatus in a constant stream and for this reason it is of decided advantage for continuous operation. The time with the other methods is considerably greater and will vary depending upon the factors listed above.

Heating of the oil increases the rate of degassing and is of particular advantage in the final stages. It is important, however, to avoid substantial heating before the internal pressure of the gas in the oil has been substantially reduced. Otherwise residual oxygen present in the oil will cause oxidation of constituents at the more elevated temperatures. Temperatures in the final stages of up to 100° C. are usually ample for most purposes.

By subjecting the oils to vacuum treatment until the pressure of absorbed gas is in equilibrium with the external pressure, it has been found that decomposition of valuable constitutents, during subsequent vacuum distillation is greatly decreased. This is of particular importance when heat and oxygen sensitive substances, are to be distilled. A further surprising result is that the unit volume of distilland which any particular still can treat in unit time is markedly increased. For instance, with a commercial still using ordinary prior art methods of degassing, it was found that only 70 gallons and preferably 60 gallons of fish oil could be distilled per day. By degassing to equilibrium in the manner described, the same still can operate upon 115 gallons of fish oil per day. The utility of the still is thereby doubled without any significant addition to the expense or method of operation.

The preliminary treatment is carried out prior to high vacuum distillation and particularly prior to high vacuum, short path or molecular distillation processes. Such distillations and their conditions of operation are well known in the art and are described in detail in Burch 1,955,321, Hickman 1,942,858, Washburn Bureau of Standards Journal of Research, vol. 2, 1929, pages 478–483, and Hickman "Nature" Nov. 21, 1936, page 881.

What I claim is:

1. In a process of preparing a vitamin concentrate by high vacuum distillation of a fish oil which contains a vitamin content and also absorbed gases which would cause at least partial oxidation and thermal destruction of the vitamin content during the distillation treatment, the improvement which comprises substantially completely removing absorbed gases and oxidizing substances from the fish oil previous to the distillation by subjecting the oil while in the form of a thin film to extreme agitation and to a pressure of less than about .005 mm. and maintaining the agitation and reduced pressure for a period of time until the internal pressure of the gas in the oil is below about .015 mm.

2. In a process of preparing a vitamin concentrate by high vacuum distillation of a fish oil which contains a vitamin and also absorbed gases which would cause at least partial oxidation and thermal destruction of the vitamin content during the distillation treatment, the improvement which comprises substantially completely removing absorbed gases and oxidizing substances from the fish oil previous to the distillation by subjecting the oil while in the form of a thin film to extreme agitation and to a pressure of less than about .005 mm. and maintaining the agitation and reduced pressure from a fraction of a minute to a few minutes until the internal pressure of the gas in the oil is below about .015 mm.

KENNETH C. D. HICKMAN.